(12) United States Patent
Sasaki

(10) Patent No.: US 8,873,108 B2
(45) Date of Patent: Oct. 28, 2014

(54) IMAGE PROCESSING APPARATUS AND IMAGE PROCESSING METHOD

(75) Inventor: Yoshitaka Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 539 days.

(21) Appl. No.: 12/893,847

(22) Filed: Sep. 29, 2010

(65) Prior Publication Data

US 2011/0102859 A1     May 5, 2011

(30) Foreign Application Priority Data

Nov. 2, 2009   (JP) ................................. 2009-252152

(51) Int. Cl.
| | |
|---|---|
| *H04N 1/407* | (2006.01) |
| *H04N 1/409* | (2006.01) |
| *G06F 3/08* | (2006.01) |
| *H04N 1/60* | (2006.01) |

(52) U.S. Cl.
CPC .............. *H04N 1/4072* (2013.01); *H04N 1/407* (2013.01); *H04N 1/6005* (2013.01); *H04N 1/6097* (2013.01)
USPC ......... 358/3.26; 358/1.9; 358/3.01; 358/3.02; 358/518; 358/520; 358/521

(58) Field of Classification Search
CPC ......... H04N 1/38; H04N 1/387; H04N 1/393; H04N 1/3935; H04N 1/407; H04N 1/409; H04N 1/4097; H04N 2201/0431; G06T 5/00
USPC ........................................... 358/1.9, 518–525
See application file for complete search history.

(56) References Cited

U.S. PATENT DOCUMENTS

| | | | | |
|---|---|---|---|---|
| 4,685,071 | A * | 8/1987 | Lee ............................... | 382/162 |
| 5,023,917 | A * | 6/1991 | Bose et al. .................... | 382/149 |
| 5,408,342 | A * | 4/1995 | Kumada et al. ............... | 358/518 |
| 6,061,091 | A * | 5/2000 | Van de Poel et al. ......... | 348/241 |
| 6,181,384 | B1  | 1/2001 | Kurashige et al. | |
| 7,034,896 | B2 * | 4/2006 | Ito et al. ........................ | 348/675 |
| 7,239,425 | B2 * | 7/2007 | Namikata ...................... | 358/2.1 |
| 7,510,275 | B2 * | 3/2009 | Matsushima .................. | 347/100 |
| 7,653,256 | B2 * | 1/2010 | Kanda et al. .................. | 382/255 |
| 8,073,286 | B2 * | 12/2011 | David et al. ................... | 382/275 |
| 2002/0036716 | A1* | 3/2002 | Ito et al. ........................ | 348/674 |
| 2005/0231740 | A1* | 10/2005 | Uchino .......................... | 358/1.9 |
| 2007/0222781 | A1* | 9/2007 | Kondo et al. .................. | 345/426 |
| 2008/0186390 | A1* | 8/2008 | Sato et al. ..................... | 348/222.1 |

FOREIGN PATENT DOCUMENTS

| | | |
|---|---|---|
| JP | 10-098678 A | 4/1998 |
| JP | 2002-051226 A | 2/2002 |
| JP | 2009159281 A | 7/2009 |

* cited by examiner

*Primary Examiner* — Richard Zhu
(74) *Attorney, Agent, or Firm* — Canon U.S.A., Inc. IP Division

(57) ABSTRACT

An image processing apparatus and an image processing method are provided, which are useful for faithfully reproducing luster even if a luminance reproduction range of an output apparatus is brighter than the luminance reproduction range of an input apparatus. The image processing apparatus includes a luster region determination unit configured to determine a luster region included in an input image based on a luminance value of the input image, a luminance correction value calculation unit configured to calculate a luminance correction value of the luster region, and a corrected image generation unit configured to generate an output image by adding the luminance correction value to the luminance value of the input image.

9 Claims, 14 Drawing Sheets

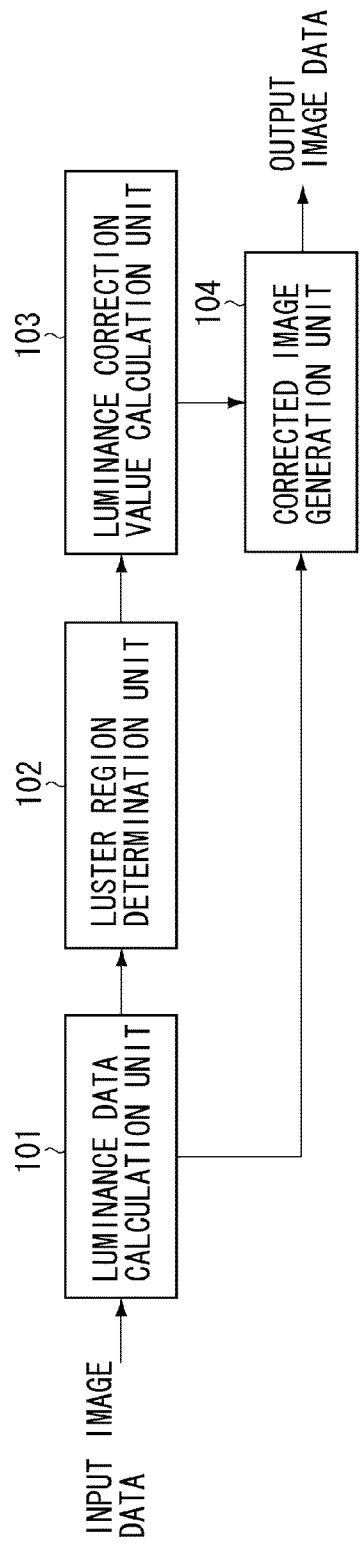

IMAGE PROCESSING APPARATUS AND IMAGE PROCESSING METHOD

BACKGROUND OF THE INVENTION

1. Field of the Invention

The present invention relates to an image processing apparatus and an image processing method useful for image processing when a luminance reproduction range of an image output device is wider than the luminance reproduction range of an image input device.

2. Description of the Related Art

In recent years, according to widespread use of image-managing devices such as digital cameras, display units, and printers, color image data is exchanged between different devices. Since the characteristics of the devices are different, sometimes the reproduced color or brightness may be different.

This is because color representation methods (e.g., RGB and CMYK) and luminance ranges that can be reproduced by the devices are different. Thus, in order to obtain a good color reproduction match between different devices, it is necessary to perform appropriate color conversion processing in a device-independent color space (e.g., CIEXYZ and CIELAB).

As a color matching technique used for matching colors of the devices, color management system (CMS) is proposed. The CMS in general uses a profile of device characteristics. For example, a profile of a printer is generated based on a color chart. The color chart includes a predetermined patch and is printed by the printer. Then, the printed color chart is measured by a measuring device, and the profile is generated according to the measurement result.

The generated profile includes a relation between a device-dependent color space and a device-independent color space. Then, by correcting color of an image using the generated profile, the color matching of the image is performed. Thus, in order to achieve good color conversion processing, an appropriate profile is to be used.

In outputting an image captured by a digital camera using a printer, a color signal value (e.g., RGB) of the image is converted into a color signal value (e.g., CIEXYZ or CIELAB) of a device-independent color space based on a digital camera profile.

Generally, a color gamut of a digital camera is wider than that of a printer. Thus, a color of an image outside the color gamut of the printer, which cannot be reproduced by the printer, is mapped to a color in the printer color gamut, which can be reproduced by the printer. Such mapping method includes absolute color matching and relative color matching. According to the absolute color matching, the color in the printer color gamut is maintained so that faithful reproduction of the input image is realized. According to the relative color matching, the conversion is performed so that the color tone of the output white color matches the color tone of the input white color. In this way, the impression of the input image and the output image becomes similar.

Then, according to the printer profile, a color signal value in a device-independent color space is converted into a color signal value (e.g., CMYK) in a printer-dependent color space. According to such processing, an image captured by a digital camera is converted into an image that can be processed by a printer, and then the image is output by the printer.

Further, in recent years, according to the progress of devices, demand for accurate reproduction of an object in an image with respect to texture such as luster as well as color is increasing. For example, U.S. Pat. No. 6,181,384 discusses a technique that corrects an image of an input video signal based on a reflected light model and generates metallic luster.

However, if the conventional color image matching technique is used, a color image with luster may not be appropriately reproduced when image processing is performed among a plurality of devices.

First, the reason why the conventional color image matching technique is not useful in appropriately reproducing luster of an image will be described.

Generally, luster of an object greatly depends on bidirectional reflectance distribution function (BRDF). The BRDF indicates reflectance with respect to a combination of an incident light angle and a reflected light angle of an object. When the object is a low luster object, specular reflection component of the BRDF will be similar regardless of the incident light angle and the reflected light angle. However, when the object is a high luster object, the specular reflection component will be greater.

FIG. 1A illustrates the BRDF of a low luster object. FIG. 1B illustrates the BRDF of a high luster object. As illustrated in FIGS. 1A and 1B, the specular reflection component of the high luster object is great. Thus, a great luminance difference is generated between the high luster region and other regions in the image.

Thus, for example, if an image of an object with luster is captured by a digital camera and displayed on a display, the luster of the object is not fully reproduced on the display. In other words, if an image of an object with luster is captured by a digital camera, highlight clipping of the luster region occurs, and the luster of the object is reduced when it is reproduced. Thus, according to the conventional color matching technique, even if such an image is displayed on a bright display, the luster of the object is not fully reproduced.

This mechanism will be described in detail with reference to FIGS. 2A and 2B. FIGS. 2A and 2B illustrate reproduction methods employing the conventional color image matching technique. The illustrations in FIGS. 2A and 2B include a luminance range 1001 of an object with luster, a luminance range 1002 of an image input apparatus such as a digital camera, and a luminance range 1003 of an image output apparatus such as a display.

In FIGS. 2A and 2B, the luminance range of the image input apparatus is narrow compared with the luminance range of the image output apparatus. Further, the maximum luminance value of the image input apparatus is lower than that of the image output apparatus.

FIG. 2A illustrates an example of absolute color matching and FIG. 2B illustrates an example of relative color matching. As illustrated in FIG. 2A, according to the absolute color matching where the luminance range 1002 of the image input apparatus is maintained, the luminance is displayed according to the brightness limited by the image capturing regardless of the luminance range 1003 of the image output apparatus. As a result, the luminance range 1001 of the object cannot be satisfactorily reproduced.

Further, as illustrated in FIG. 2B, according to the relative color matching where gradation is reproduced according to the luminance range of the device, since the image is generally converted into a brighter image according to the luminance range 1003 of the image output apparatus, the color matching accuracy with respect to the gradation region other than the luster region is poor.

Further, with respect to the image acquired by the image input apparatus, the gradation in the luster region is not properly reproduced (highlight clipping occurs). Thus, according to the absolute and relative color matching illustrated in FIGS. 2A and 2B, gradation of the luster region of the output image is not accurately reproduced.

SUMMARY OF THE INVENTION

According to an aspect of the present invention, an image processing apparatus includes a luster region determination unit configured to determine a luster region included in an input image based on a luminance value of the input image, a luminance correction value calculation unit configured to calculate a luminance correction value of the luster region, and a corrected image generation unit configured to add the luminance correction value to the luminance value of the input image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a block diagram illustrating a configuration of an image processing apparatus according to a first exemplary embodiment of the present invention.

DESCRIPTION OF THE EMBODIMENTS

Various exemplary embodiments, features, and aspects of the invention will be described in detail below with reference to the drawings.

First, a first exemplary embodiment will be described. FIG. 3 is a block diagram illustrating a configuration of an image processing apparatus according to a first exemplary embodiment of the present invention.

The image processing apparatus according to the first exemplary embodiment includes a luminance data calculation unit 101, a luster region determination unit 102, a luminance correction value calculation unit 103, and a corrected image generation unit 104. The luminance data calculation unit 101 calculates a luminance value from input image data. The luster region determination unit 102 determines a luster region of the input image according to the luminance value calculated by the luminance data calculation unit 101.

The luminance correction value calculation unit 103 calculates a luminance correction value of the luster region determined by the luster region determination unit 102. The corrected image generation unit 104 generates output image data by adding the luminance correction value calculated by the luminance correction value calculation unit 103 to the luminance value of the input image data calculated by the luminance data calculation unit 101.

Figure 4:
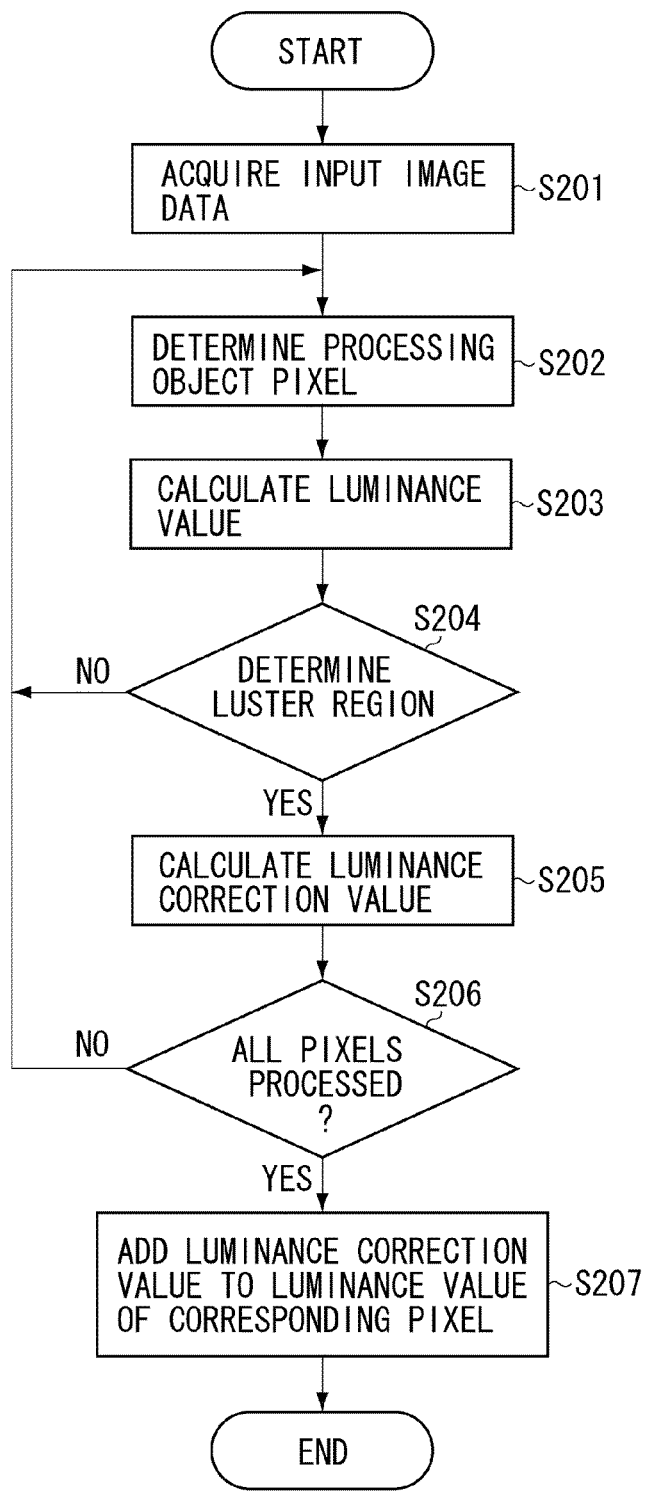
FIG. 4 is a flowchart illustrating an operation of the image processing apparatus according to the first exemplary embodiment.

Next, an operation (image processing method) of the image processing apparatus according to the first exemplary embodiment will be described. FIG. 4 is a flowchart illustrating an operation of the image processing apparatus according to the first exemplary embodiment.

In step S201, the luminance data calculation unit 101 acquires input image data. Although sRGB image data is used as the input image data according to the present exemplary embodiment, image data in other formats such as an Adobe RGB image, a RGB image captured by a camera, or a CMYK image for a printer may also be used.

In step S202, the luminance data calculation unit 101 determines a processing object pixel. The order in which the processing object pixel is determined may be determined arbitrarily. For example, the processing object pixel is determined from the upper left portion of the image to the lower right portion.

In step S203, the luminance data calculation unit 101 calculates a luminance value of the processing object pixel. If the RGB value of the processing object pixel is ($R_0$, $G_0$, $B_0$), a luminance value $Y_0$ is expressed by the following equation.

$$Rs = R_0 / 12.92$$
$$Gs = G_0 / 12.92 \quad \text{if } R_0, G_0, B_0 \leq 0.03928 \qquad (1)$$
$$Bs = B_0 / 12.92$$

$$Rs = \left[\frac{R_0 + 0.055}{1.055}\right]^{2.4}$$
$$Gs = \left[\frac{G_0 + 0.055}{1.055}\right]^{2.4} \quad \text{if } R_0, G_0, B_0 > 0.03928$$
$$Bs = \left[\frac{B_0 + 0.055}{1.055}\right]^{2.4}$$

$$\begin{bmatrix} X_0 \\ Y_0 \\ Z_0 \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} Rs \\ Gs \\ Bs \end{bmatrix}$$

If a CMYK image for a printer is used as the input image, the luminance value of the processing object pixel is acquired by referring to a look-up table (LUT) which is generated in advance. The LUT shows a relation between the CMYK values and the XYZ values.

In step S204, the luster region determination unit 102 determines whether the processing object pixel is a pixel in the luster region according to the luminance value calculated by the luminance data calculation unit 101.

Figure 1A:
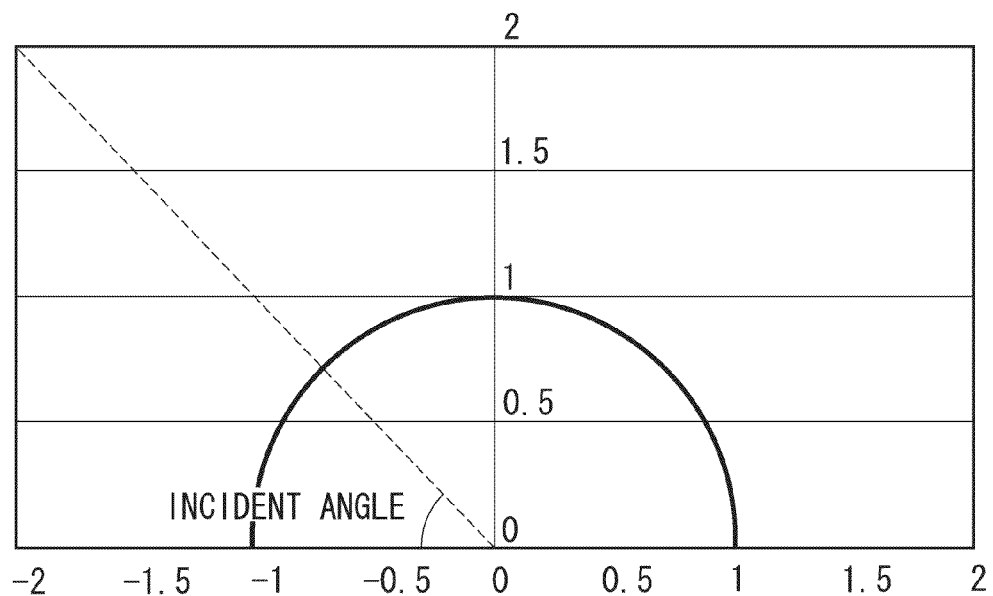
FIGS. 1A and 1B are diagrams illustrating bidirectional reflectance distribution function (BRDF).
Figure 1B:
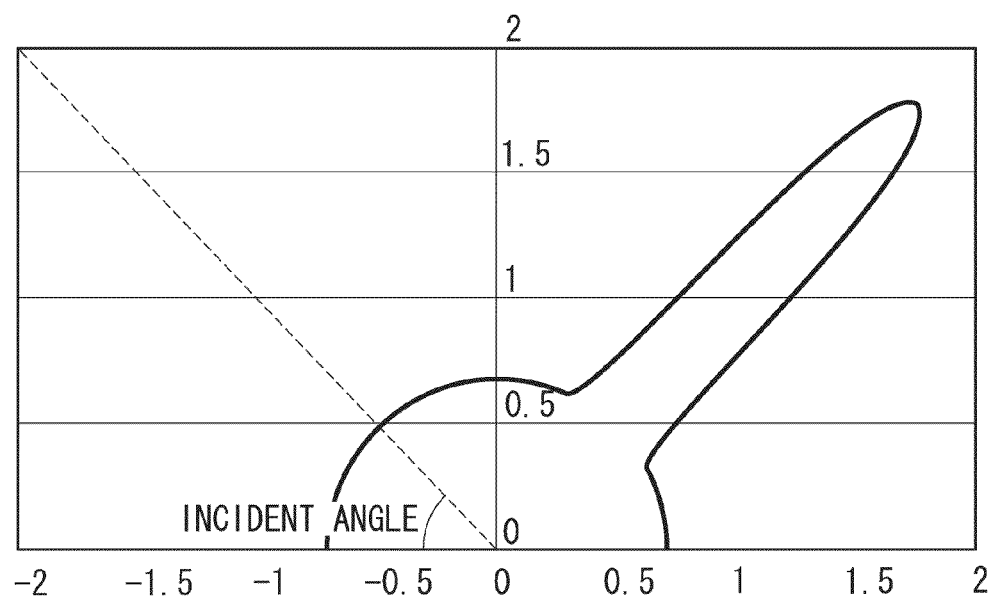
Figure 2A:
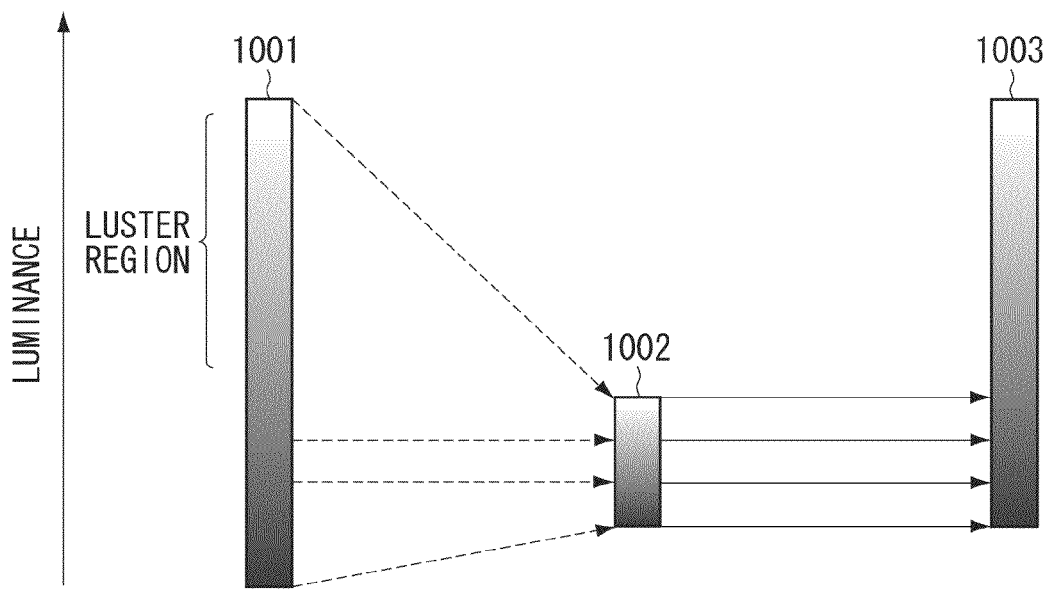
FIGS. 2A and 2B illustrate reproduction methods using conventional color image matching techniques.
Figure 2B:
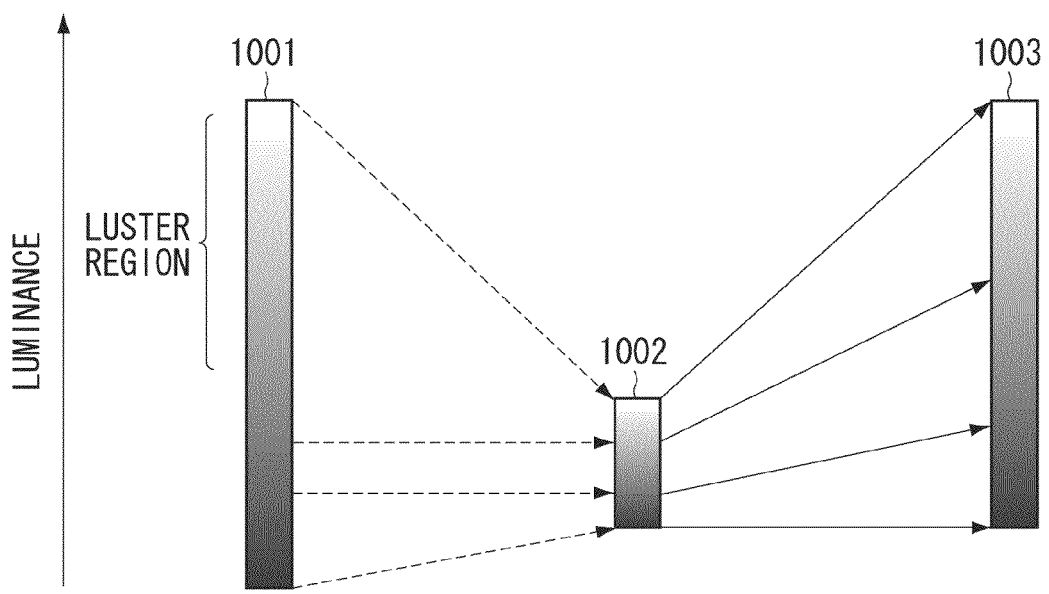

Since the luminance of the luster region and the luminance of the region surrounding the luster region depend on the BRDF illustrated in FIG. 1, the luminance value of the processing object pixel corresponding to the luster region is high and, further, the luminance difference between the processing object pixel and the surrounding pixels (surrounding pixels in a predetermined range at the periphery of the processing object pixel).

Thus, according to the present exemplary embodiment, the luster region determination unit 102 determines that the processing object pixel is in the luster region if the following equation is satisfied. In the following equation, the luminance value of the processing object pixel is $Y_0$, the minimum luminance value of the luster region is $Y_L$, the luminance difference between the processing object pixel and the surrounding pixels is $\Delta Y_0$, and the least luminance difference between the luster region and the non-luster region is $\Delta Y_L$. $Y_L \leq Y_0$ and $\Delta Y_L \leq \Delta Y_0$ Further, according to the present exemplary embodiment, although predetermined values are set as $Y_L$ and $\Delta Y_L$ in advance, variable values that change according to the input luminance values or the like may also be used.

If the processing object pixel is determined as a pixel in the luster region (YES in step S204), the processing proceeds to step S205. If not (No in step S204), then the processing returns to step S202.

In step S205, the luminance correction value calculation unit 103 calculates the luminance correction value of the processing object pixel. The luminance correction value calculation unit 103 determines the luminance correction value $Y_c$ according to, for example, the following equation where the luminance of the processing object pixel is $Y_0$, the luminance difference between the surrounding pixels and the processing object pixel is $\Delta Y_0$, and coefficients are α and β. $Y_c = \alpha Y_0 + \beta \Delta Y_0$  $0 \leq \alpha \leq 1, 0 \leq \beta \leq 1$ According to the present exemplary embodiment, the luminance correction value is acquired using a predetermined coefficient set in advance. Regarding the coefficients, values that vary depending on, for example, the processing object pixel luminance and/or the luminance difference between the processing object pixel and the surrounding pixels may also be used.

In step S206, whether processing of all the pixels in the input image has been completed is determined. If the processing of all pixels has been completed (YES in step S206), then the processing proceeds to step S207. If not (NO in step S206), then the processing returns to step S202.

In step S207, the corrected image generation unit 104 adds the luminance correction value calculated by the luminance correction value calculation unit 103 to the luminance value of the pixel corresponding to the luminance correction value, and calculates the luminance value $Y_1$ after the correction.

$Y_1 = Y_0 + Y_c$

Then, the processing ends.

According to the first exemplary embodiment, luminance correction is applied to a luminance value of a pixel in a luster region. However, luminance correction is not applied to a luminance value of a pixel in a non-luster region. Accordingly, the luminance difference between the luster region and the surrounding regions is emphasized, and the quality of the luster of the luster region in the output image is improved.

Figure 5:
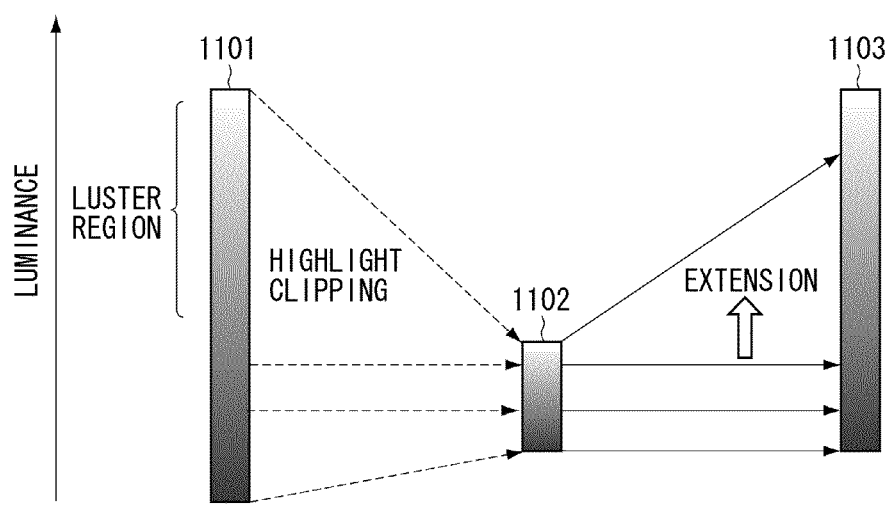
FIG. 5 illustrates an effect of the first exemplary embodiment.

FIG. 5 illustrates an effect of the first exemplary embodiment. The illustration in FIG. 5 includes a luminance range 1101 of an object with luster, a luminance range 1102 of an image input apparatus such as a digital camera, and a luminance range 1103 of an image output apparatus such as a display.

Generally, highlight clipping, which affects luster of a captured image, may occur if the luminance range 1101 of an object with luster is limited within the luminance range 1102 of an image input apparatus such as a digital camera.

In such a case, even if the luminance range 1103 of the image output apparatus is wider than the luminance range 1102 of the image input apparatus, according to the first exemplary embodiment, the luminance of the non-luster region is faithfully reproduced with respect to the input image and only the luminance value of the luster region is extended. As a result, both the conventional color matching and reproduction of luster can be realized.

Next, a second exemplary embodiment of the present invention will be described. If luster regions of different sizes exist in an input image, in determining a luster region (e.g., step S204 in the first exemplary embodiment), it is desirable to perform image processing according to the size of the region. Such image processing is performed according to the second exemplary embodiment.

An example of a luster region which is obtained when Laplacian of Gaussian (LOG) filters of different sizes are applied to input image data will be described.

Figure 6:
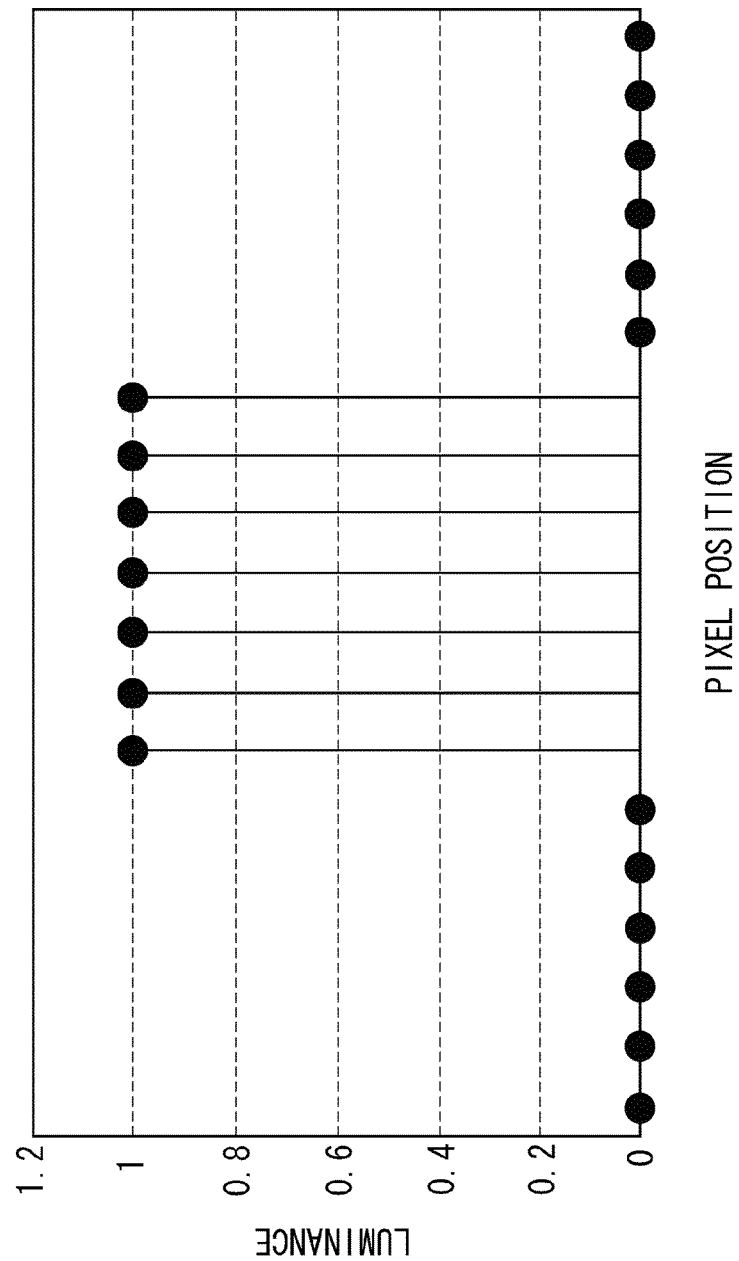
FIG. 6 is a schematic diagram illustrating an example change of a luminance signal value in the one-dimensional direction.

FIG. 6 is a schematic diagram illustrating an example of changes in the luminance signal values of pixels surrounding a pixel in a luster region of an image in the one-dimensional direction. In FIG. 6, high luminance values indicate the luster region and the low luminance values indicate the non-luster region.

Figure 7A:
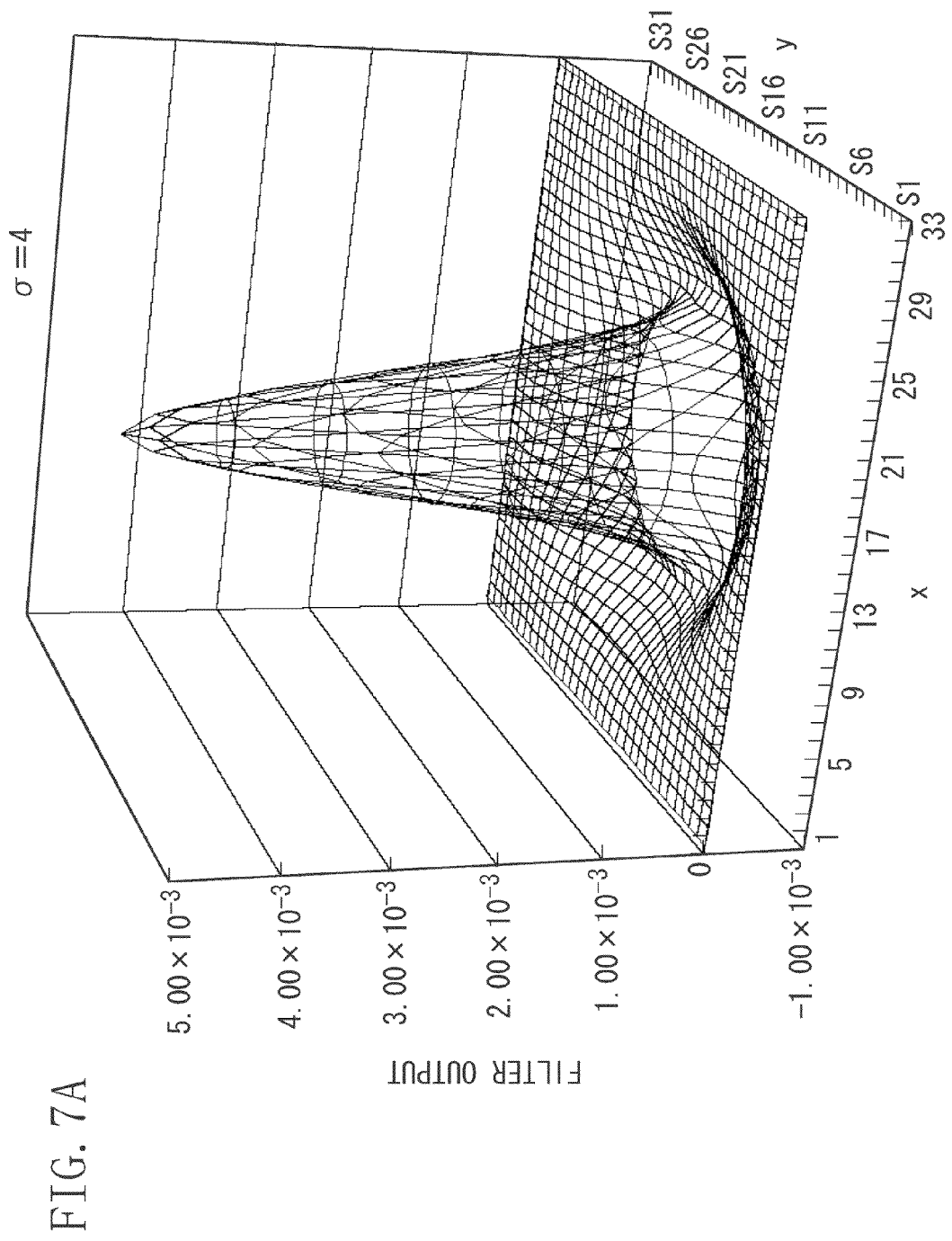
FIGS. 7A and 7B are schematic diagrams illustrating LOG filters of different sizes.
Figure 7B:
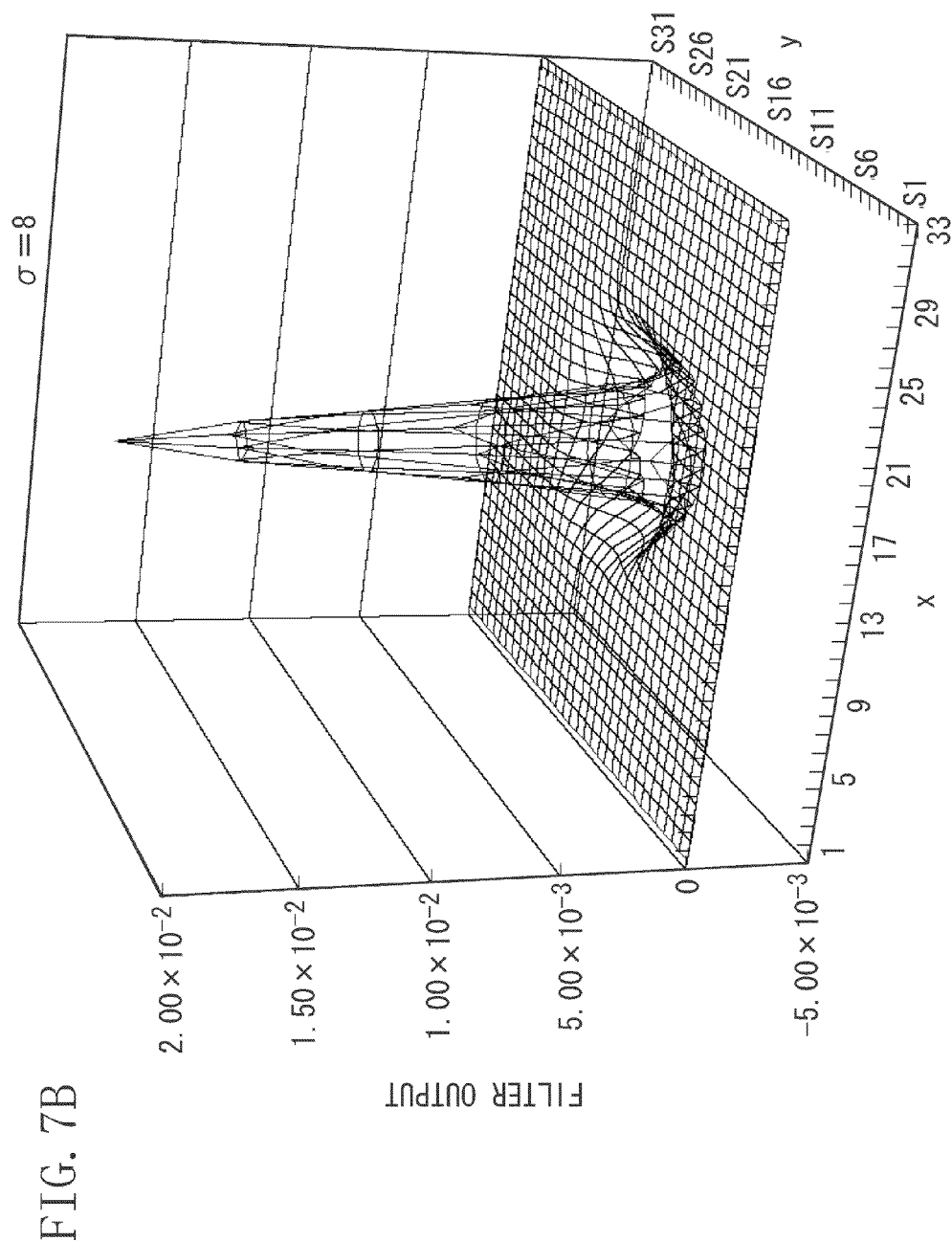

Further, FIGS. 7A and 7B are schematic diagrams illustrating LOG filters of different sizes. The coefficient of each of the LOG filters is expressed by the following equation. According to the present exemplary embodiment, the luminance difference between the processing object pixel and the surrounding pixels is calculated by performing convolution using the coefficient obtained by the following equation.

$$\nabla^2 G = \left(\frac{x^2 + y^2 - 2\sigma^2}{2\pi\sigma^4}\right)\exp\left(-\frac{x^2 + y^2}{2\sigma^2}\right) \quad (2)$$

In the equation above, σ is a parameter controlling the filter size, and x and y represent a position of the filter. As illustrated in FIGS. 7A and 7B, the coefficient of the LOG filter is set in such a manner that the coefficient of the processing object pixel (central position in FIGS. 7A and 7B) is the largest and the coefficient is reduced with distance from the processing object pixel.

Figure 8A:
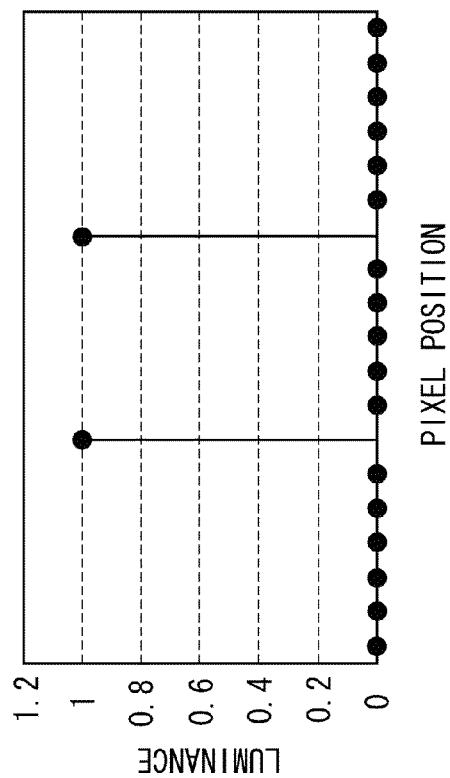
FIGS. 8A and 8B are schematic diagrams illustrating luster ranges that are obtained by an application of the filters illustrated in FIGS. 7A and 7B.
Figure 8B:
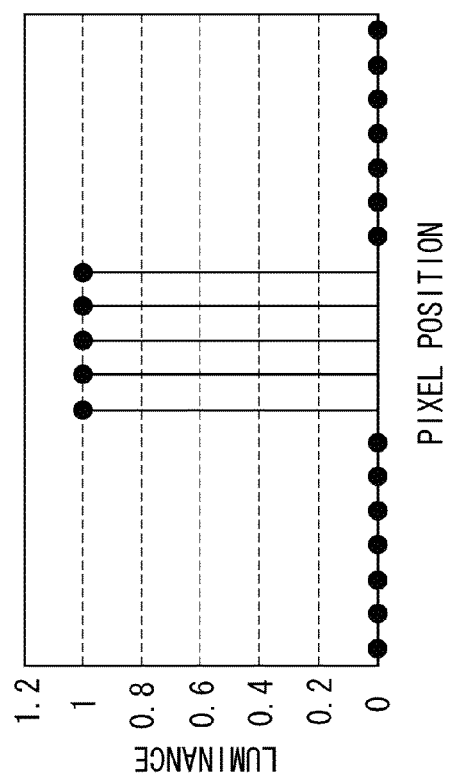

FIG. 7A illustrates a case where a LOG filter with σ=8 is used. FIG. 7B illustrates a case where a LOG filter with σ=4 is used. FIGS. 8A and 8B are schematic diagrams of luster regions that are obtained by applying the LOG filters illustrated in FIGS. 7A and 7B to the input image signal illustrated in FIG. 6. FIG. 8A is a schematic diagram illustrating a luster region obtained by applying the filter illustrated in FIG. 7A. FIG. 8B is a schematic diagram illustrating a luster region obtained by applying the filter illustrated in FIG. 7B.

Since the LOG filter in FIG. 7A is large, the boundary portion between the luster region and the non-luster region is smoothed and the luster region is smaller than the luster region obtained by the input image signals illustrated in FIG.

6. On the other hand, since the size of the LOG filter in FIG. 7B is small, the obtained luster region is limited to the boundary of the luster region.

As is evident from FIGS. 8A and 8B, it is desirable to use a combination of a plurality of LOG filters of different sizes in order to appropriately extract luster regions of different sizes.

Figure 9:
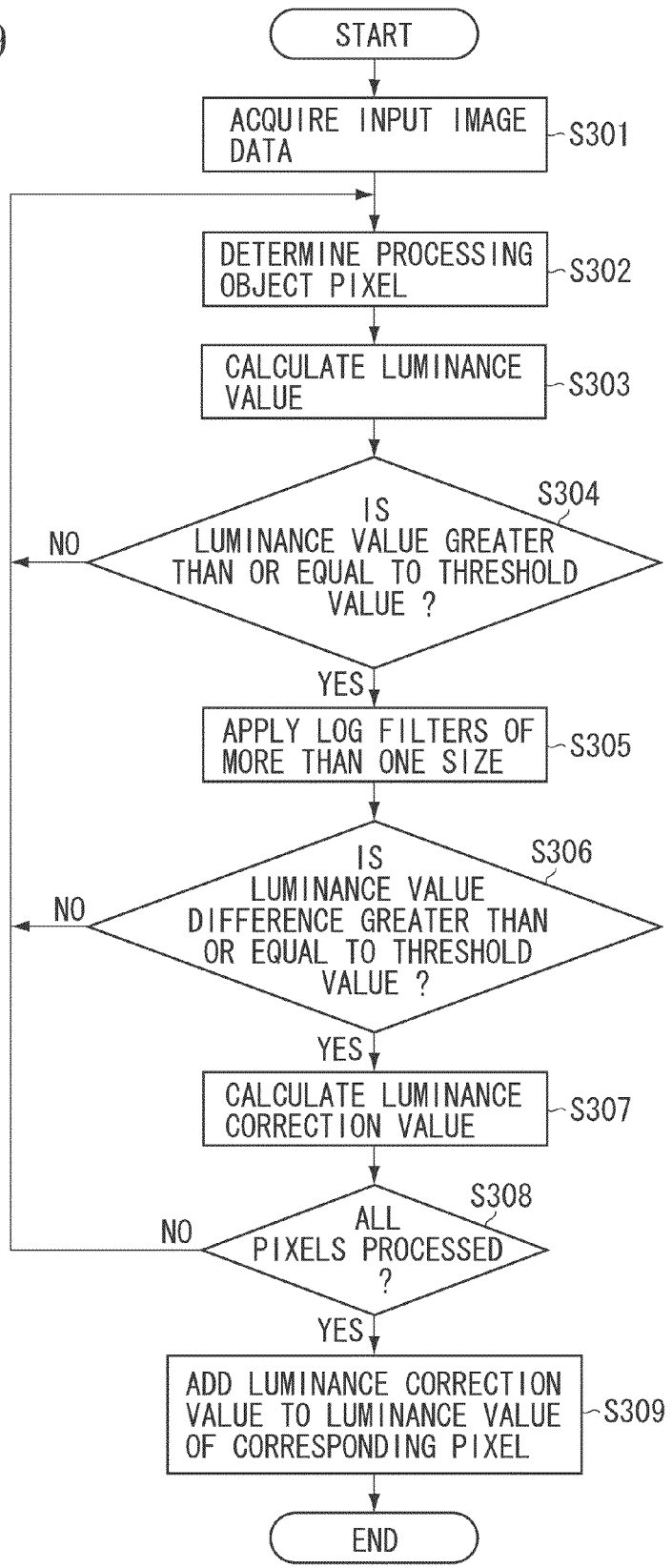
FIG. 9 is a flowchart illustrating an operation of the image processing apparatus according to a second exemplary embodiment.

Thus, according to the second exemplary embodiment, three LOG filters of different sizes are used in the correction of an image. FIG. 9 is a flowchart illustrating an operation of the image processing apparatus according to the second exemplary embodiment.

In steps S301 to step S303, the luminance data calculation unit 101 performs processing similar to the processing performed in steps S201 to S203 (see FIG. 4) according to the first exemplary embodiment.

In step S304, the luster region determination unit 102 determines whether the luminance value $Y_0$ calculated by the luminance data calculation unit 101 is greater than or equal to the predetermined threshold value $Y_L$. If the luminance value $Y_0$ is greater than or equal to the threshold value $Y_L$ (YES in step S304), the processing proceeds to step S305. If the luminance value $Y_0$ is smaller than the threshold value $Y_L$ (NO in step S304), then the processing returns to step S302.

In step S305, the luster region determination unit 102 applies LOG filters of three different sizes (i.e., $\sigma=1$, 4, and 16) to the processing object pixel. Then, application results $L_1$, $L_4$, and $L_{16}$ of the LOG filters are calculated. Although three LOG filters are applied according to the present exemplary embodiment, the size and the number of the filters to be applied are not limited thereto, and the size and the number can be arbitrarily set according to the input image.

In step S306, the luster region determination unit 102 determines whether the luminance difference $\Delta Y_0$ between the luminance of the processing object pixel and the luminance of the surrounding pixels is greater than or equal to the predetermined threshold value $\Delta Y_L$. The luminance difference $\Delta Y_0$ is obtained by summing "$L_1$, $L_4$, and $L_{16}$".

If the luminance difference $\Delta Y_0$ is greater than or equal to the threshold value $\Delta Y_L$ (YES in step S306), the processing proceeds to step S307. If the luminance difference $\Delta Y_0$ is smaller than the threshold value $\Delta Y_L$ (NO in step S306), the processing returns to step S302. In other words, the luster region determination unit 102 determines that the processing object pixel is in the non-luster region if the luminance difference $\Delta Y_0$ is smaller than the threshold value $\Delta Y_L$.

In step S307, the luminance correction value calculation unit 103 determines the luminance correction value of the processing object pixel. For example, if the coefficients corresponding to the output of the LOG filters are $\beta_1$, $\beta_4$, and $\beta_{16}$, the luminance correction value $Y_c$ is determined according to the following equation.

$$Y_c = \beta_1 L_1 + \beta_4 L_4 + \beta_{16} L_{16}$$

The method for obtaining the luminance correction value is not limited to the above-described correction value and can be calculated, for example, by using $\beta_1$, $\beta_4$, and $\beta_{16}$, which are variable according to the input luminance value of the input.

In steps S308 and S309, the luminance data calculation unit 101 and the corrected image generation unit 104 perform processing similar to the processing performed in steps S206 and S207 in the first exemplary embodiment. Then, the processing ends.

Figure 10:
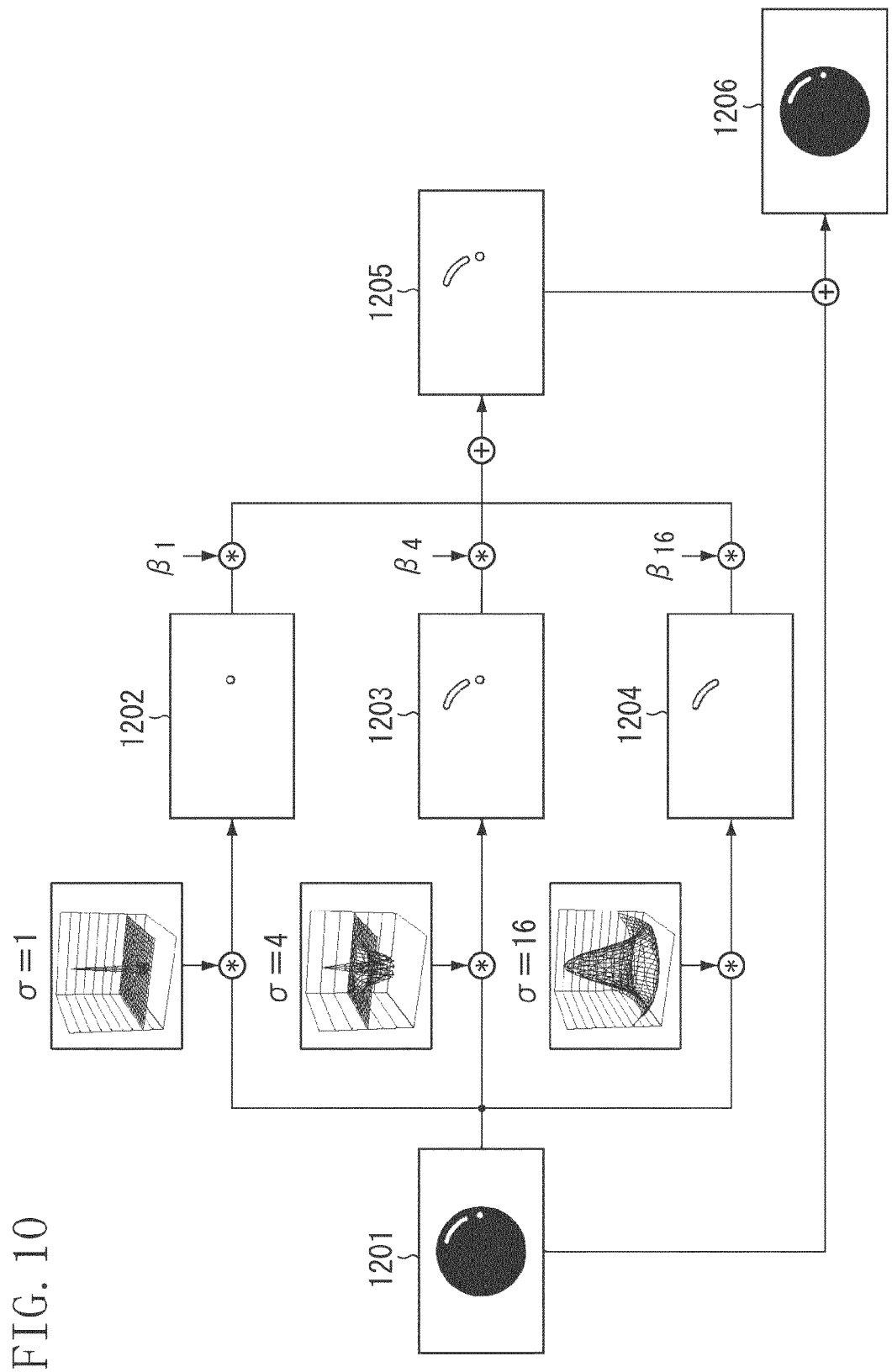
FIG. 10 illustrates a modification example of the second exemplary embodiment.

Next, the processing according to the present exemplary embodiment will be described referring to the block diagram in FIG. 10. FIG. 10 illustrates a case where input image data 1201, which is input data of an image including an object having a spherical luster region, is used.

The luster region determination unit 102 applies three LOG filters with different sizes ($\sigma=1$, 4, and 16) to the input image data 1201. According to the application of the LOG filters, luster region extracted image data 1202, 1203 and 1204 can be obtained. This processing corresponds to the processing performed in step S305. In other words, the luster region extracted image data 1202 is data obtained as a result of an application of the LOG filter of $\sigma=1$ to the input image data 1201, and is luster region extracted image data corresponding to the application result $L_1$.

The luster region extracted image data 1203 is data obtained as a result of an application of the LOG filter of $\sigma=4$ to the input image data 1201 and is the luster region extracted image data corresponding to the application result $L_4$. The luster region extracted image data 1204 is data obtained as a result of an application of the LOG filter of $\sigma=16$ to the input image data 1201 and the luster region extracted image data corresponding to the application result $L_{16}$.

The luminance correction value calculation unit 103 applies the luminance correction coefficients $\beta_1$, $\beta_4$, and $\beta_{16}$ to the luster region extracted image data 1202, 1203, and 1204, respectively, and calculates a sum of the application result. As a result, luminance corrected image data 1205 is obtained. This processing corresponds to step S307.

Next, the corrected image generation unit 104 adds the luminance corrected image data 1205 to the input image data 1201. As a result, a luster reproduction image 1206 is obtained. This processing corresponds to the processing performed in step S309.

According to the second exemplary embodiment, even if luster regions of different sizes exist in the input image, image processing suitable for the sizes of the luster ranges can be performed. Thus, appropriate luster reproduction is possible.

Next, a third exemplary embodiment of the present invention will be described. According to the first and the second exemplary embodiments, the luster is reproduced by extending the luminance value of the input image data. However, as described above, the output device also has a reproduction-possible luminance range.

Figure 11:
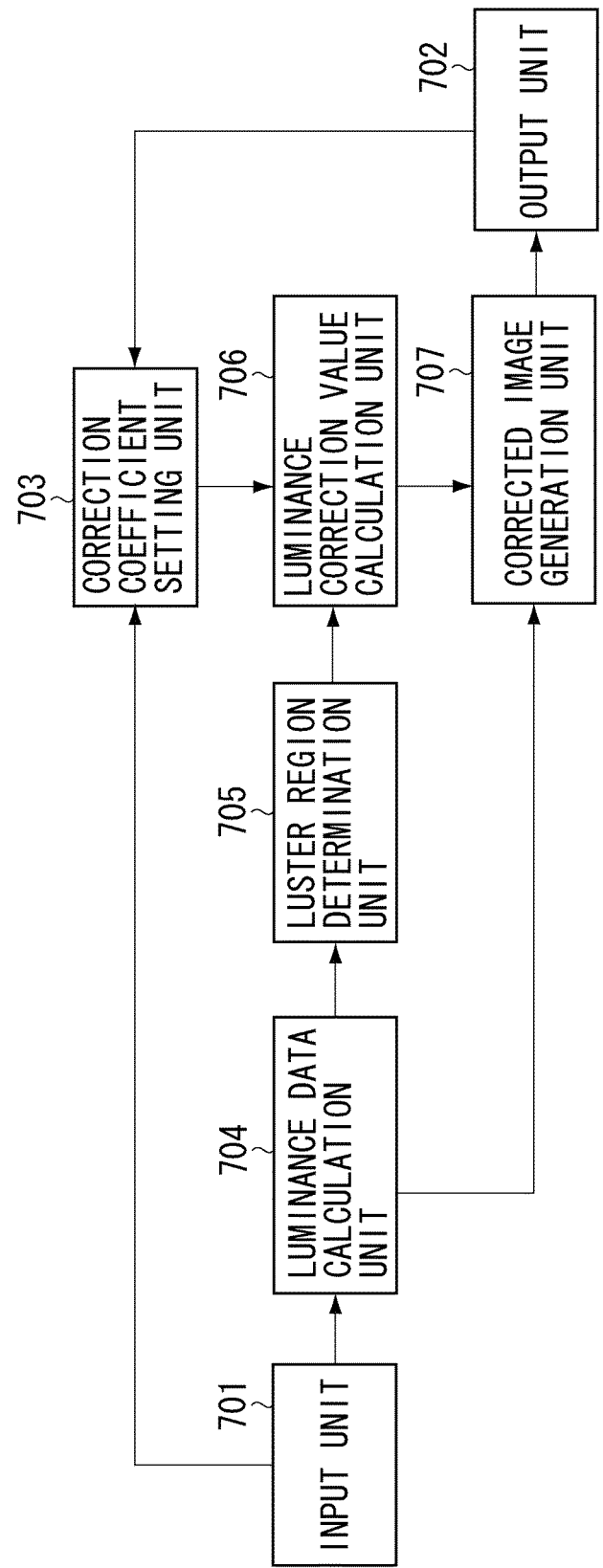
FIG. 11 is a block diagram illustrating a configuration of the image processing apparatus according to a third exemplary embodiment of the present invention.

By considering a luminance range that can be reproduced by the output device when extending the luminance value, the luster can be appropriately reproduced. Such image processing is performed according to the third exemplary embodiment. FIG. 11 is a block diagram illustrating a configuration of the image processing apparatus according to the third exemplary embodiment.

The image processing apparatus according to the third exemplary embodiment includes an input unit 701, an output unit 702, a correction coefficient setting unit 703, a luminance data calculation unit 704, a luster region determination unit 705, a luminance correction value calculation unit 706, and a corrected image generation unit 707. The input unit 701 inputs input an image and maximum input/output luminance values. The output unit 702 generates output image data.

The correction coefficient setting unit 703 sets a luminance correction coefficient using the maximum input/output luminance values acquired from the input unit 701 and the output unit 702. The luminance data calculation unit 704 calculates a luminance value from the input image data. The luster region determination unit 705 determines a luster region in the input image based on the luminance value calculated by the luminance data calculation unit 704.

The luminance correction value calculation unit 706 acquires the luminance correction coefficient from the correction coefficient setting unit 703 and calculates a luminance correction value of the luster region that has been determined by the luster region determination unit 705. The corrected image generation unit 707 generates a luminance correction value of the luster region by adding the luminance value of the input image calculated by the luminance data calculation unit 704 and the luminance correction value calculated by the luminance correction value calculation unit 706.

Figure 12:
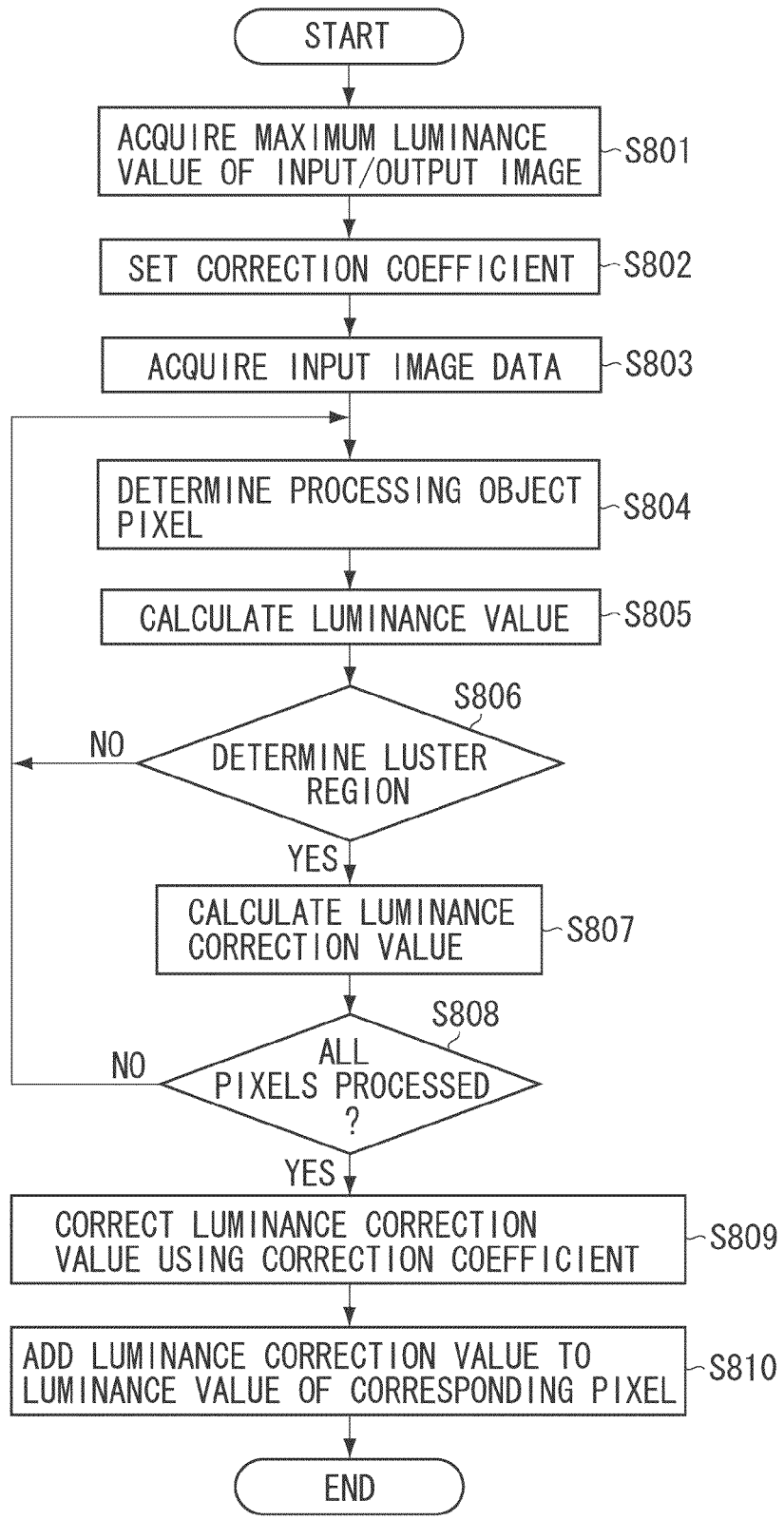
FIG. 12 is a flowchart illustrating an operation of the image processing apparatus according to the third exemplary embodiment.

Next, an operation (image processing method) of the image processing apparatus according to the third exemplary embodiment will be described. FIG. 12 is a flowchart illustrating an operation of the image processing apparatus according to the third exemplary embodiment.

In step S801, the correction coefficient setting unit 703 acquires maximum input/output luminance values $Y_{in}$ and $Y_{out}$ from the input unit 701 and the output unit 702. The method for acquiring the maximum input/output luminance values $Y_{in}$ and $Y_{out}$ is not limited to one.

For example, the maximum input/output luminance values $Y_{in}$ and $Y_{out}$ can be acquired by connecting a dedicated measurement device to the input unit 701 and the output unit 702 or by connecting a storage unit in which device profiles describing input/output device characteristics and acquiring the maximum input/output luminance values $Y_{in}$ and $Y_{out}$ from the storage unit.

In step S802, the correction coefficient setting unit 703 sets a correction coefficient according to the maximum input/output luminance values $Y_{in}$ and $Y_{out}$. The correction coefficient can be set to a different value so long as the corrected luminance value does not exceed the maximum output luminance value when the luminance correction processing of the luster region is performed.

For example, the correction coefficient is controlled so that the luminance correction value does not exceed a maximum input/output luminance difference values $\Delta Y_{max}$ ($\Delta Y_{max} = Y_{out} - Y_{in}$). Further, the maximum luminance values $Y_{in}$ and $Y_{out}$ can be used as luminance correction coefficients.

In steps S803 to S808, the luminance data calculation unit 704, the luster region determination unit 705, and the luminance correction value calculation unit 706 perform processing similar to the processing performed in steps S201 to S206 according to the first exemplary embodiment. In step S806, the luster region determination unit 705 may perform processing similar to the processing performed in steps S304 to S306 in the second exemplary embodiment. In other words, the luster region may be determined by using a plurality of LOG filters of different sizes.

In step S808, if the processing of all the pixels is completed (YES in step S808), the processing proceeds to step S809. If the processing is not completed (NO in step S808), then the processing returns to step S804, and the next processing object pixel is determined.

In step S809, the luminance correction value calculation unit 706 applies the luminance correction coefficient set by the correction coefficient setting unit 703 to the luminance correction value of the processing object pixel determined in step S807, so that the luminance value does not exceed the maximum output luminance value.

The correction method is not limited to any particular method and, for example, a luminance correction value after the correction $Y_o$ may be acquired by the correction according to the following equation (3). In the equation, the luminance correction coefficient is calculated as $\Delta Y_{max} = Y_{out} - Y_{in}$, the luminance correction value of the processing object pixel is $Y_c$, and the maximum and minimum values of the luminance correction values of all the processing object pixels are $dY_{max}$ and $dY_{min}$.

$$dY_c' = \Delta Y_{max} \frac{dY_{max} - dY}{dY_{max} - dY_{min}} \quad (3)$$

In step S810, the corrected image generation unit 707 adds the luminance correction values calculated by the processing performed so far to the luminance value of each of the corresponding pixel. The luminance $Y_1$ after the correction is acquired by the following equation.

$$Y_1 = Y_0 + Y_c'$$

Then, the corrected image generation unit 707 outputs output image data of the luminance value $Y_1$ after the correction to the output unit 702. Then, the processing ends.

According to the third exemplary embodiment, since the maximum luminance values of the input/output devices are referred in determining the luminance correction value, luster reproduction according to the characteristics of the input/output devices is possible.

Figure 13A:
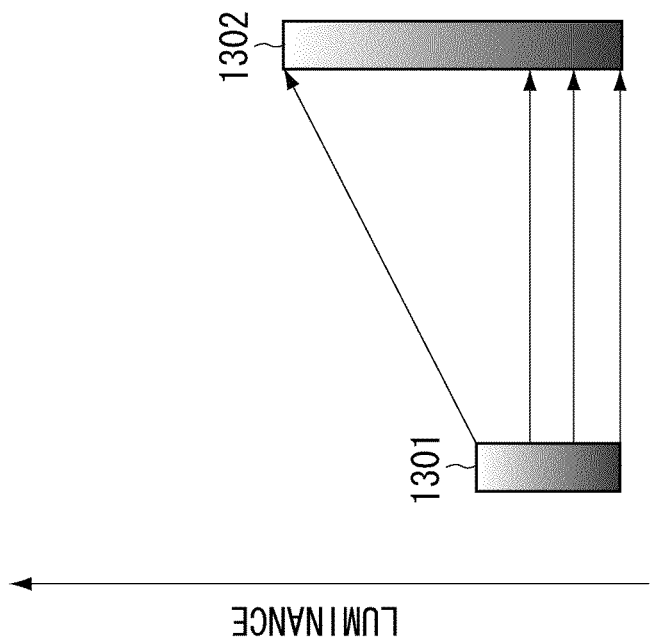
FIGS. 13A and 13B illustrate effects of the third exemplary embodiment.
Figure 13B:
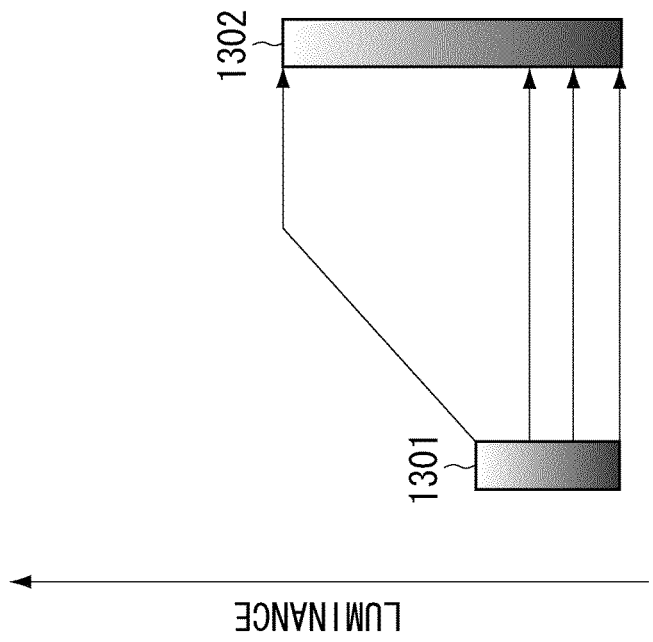

Next, the effect of the third exemplary embodiment will be described in detail. FIGS. 13A and 13B illustrate the effect obtained from the third exemplary embodiment. FIGS. 13A and 13B illustrate a luminance range 1301 of an image input apparatus such as a digital camera, and a luminance range 1302 of an image output apparatus such as a display.

If a luminance correction such as the one performed in the present exemplary embodiment is not performed, if the luminance value after the extension of the luminance value is greater than the luminance range 1302 of the image output apparatus, then, as illustrated in FIG. 13A, the luminance value after the extension is changed to the maximum value within the luminance range 1302 of the image output apparatus. Thus, highlight clipping occurs when the image is output, and the luster may not be faithfully reproduced.

On the other hand, if the luminance correction according to the present exemplary embodiment is performed, reproduction-possible luminance ranges of the input/output devices are acquired in the image processing processes, and the luminance correction value is calculated according to the relation. Thus, as illustrated in FIG. 13B, luster reproduction according to the input/output luminance ranges without highlight clipping is realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-252152 filed Nov. 2, 2009, which is hereby incorporated by reference herein in its entirety.

What is claimed is:

1. An image processing apparatus comprising:
a luster region determination unit configured to determine a luster region and regions other than the luster region included in an input image based on a luminance value of the input image;
a luminance correction value calculation unit configured to calculate a luminance correction value of the luster region; and
a corrected image generation unit configured to generate a corrected image of the input image by applying the luminance value to the regions other than the luster region and by applying an extended luminance value to the luster region, the extended luminance value being obtained by adding the calculated luminance correction value to the luminance value so that the extended luminance value is greater than a maximum luminance value of the input image and is less than a maximum luminance value to be reproduced by an output device in case that the maximum luminance value of the input image is less than the maximum luminance value to be reproduced by the output device.

2. The image processing apparatus according to claim 1, wherein if a luminance difference between a processing object pixel and surrounding pixels in a predetermined range at the periphery of the processing object pixel is greater than a predetermined value, and luminance of the processing object pixel is greater than a predetermined value, the luster region determination unit determines that the processing object pixel is included in the luster region.

3. The image processing apparatus according to claim 1, wherein the luster region determination unit determines the luster region based on a result obtained by applying a LOG filter to the input image.

4. The image processing apparatus according to claim 1, wherein the luster region determination unit determines the luster region based on a result obtained by applying a plurality of LOG filters of different sizes to the input image.

5. An image processing method comprising:
 a processor for determining a luster region and regions other than the luster region included in an input image based on a luminance value of the input image;
 the processor configured for calculating a luminance correction value of the luster region; and
 the processor configured for generating a corrected image of the input image by applying the luminance value to the regions other than the luster region and by applying an extended luminance value to the luster region, the extended luminance value being obtained by adding the calculated luminance correction value to the luminance value so that the extended luminance value is greater than a maximum luminance value of the input image and is less than a maximum luminance value to be reproduced by an output device in case that the maximum luminance value of the input image is less than the maximum luminance value to be reproduced by the output device.

6. A non-transitory computer readable storage medium storing computer-executable instructions for controlling an image processing apparatus which, when executed by a computer, cause the computer to perform operations comprising:
 determining a luster region and regions other than the luster region included in an input image based on a luminance value of the input image;
 calculating a luminance correction value of the luster region; and
 generating a corrected image of the input image by applying the luminance value to the regions other than the luster region and by applying an extended luminance value to the luster region, the extended luminance value being is obtained by adding the calculated luminance correction value to the luminance value so that the extended luminance value is greater than a maximum luminance value of the input image and is less than a maximum luminance value to be reproduced by an output device in case that the maximum luminance value of the input image is less than the maximum luminance value to be reproduced by the output device.

7. The image processing apparatus according to claim 1, wherein the luminance correction value calculation unit calculates the luminance correction value based on a luminance difference between a processing object pixel and surrounding pixels in a predetermined range at the periphery of the processing object pixel.

8. The image processing apparatus according to claim 1, wherein the luminance correction value calculation unit calculates the luminance correction value based on a result obtained by applying a LOG filter to the input image.

9. The image processing apparatus according to claim 1, wherein the luminance correction value calculation unit calculates the luminance value of the regions other than the luster region so as to be faithfully reproduced with respect to the input image.

\* \* \* \* \*